United States Patent [19]
Oslapas

[11] Patent Number: 5,096,011
[45] Date of Patent: Mar. 17, 1992

[54] STEERING GEAR AND SYSTEM FOR AUTOMOTIVE VEHICLE

[75] Inventor: Algis Oslapas, Dearborn Heights, Mich.

[73] Assignee: Ford Motor Company, Dearborn, Mich.

[21] Appl. No.: 550,242

[22] Filed: Jul. 10, 1990

Related U.S. Application Data

[63] Continuation of Ser. No. 292,178, Dec. 30, 1988, abandoned.

[51] Int. Cl.[5] ............................................. B62D 5/04
[52] U.S. Cl. ...................................... 180/79.1; 280/91; 310/13; 310/17; 318/135
[58] Field of Search ............... 180/79, 79.1, 148; 280/91; 74/388 PS; 310/12, 13, 15, 17; 318/135

[56] References Cited

U.S. PATENT DOCUMENTS

| | | | |
|---|---|---|---|
| 3,602,745 | 8/1971 | Davis | 310/13 |
| 3,904,941 | 9/1975 | Matsui et al. | 310/12 |
| 4,357,568 | 11/1982 | Hare | 310/12 |
| 4,590,411 | 5/1986 | Kelly | 318/687 |
| 4,645,025 | 2/1987 | Ohe et al. | 180/79.1 |
| 4,785,901 | 11/1988 | Maeda | 180/142 |

FOREIGN PATENT DOCUMENTS

| | | | |
|---|---|---|---|
| 55-44058 | 3/1980 | Japan | 180/79.1 |
| 63-149264 | 6/1988 | Japan | 180/79.1 |

*Primary Examiner*—Charles A. Marmor
*Assistant Examiner*—Mitchell Bompey
*Attorney, Agent, or Firm*—Jerome R. Drouillard; Raymond L. Coppiellie; Roger L. May

[57] ABSTRACT

A steering gear for an automotive vehicle includes a linear electric motor having a plunger linked to an axle set of roadwheels with a vehicle and a controller for operating the linear motor. The controller may include sensors for torque applied to a steering shaft attached to a steering handwheel operated for the driver and for also sensing vehicle speed. A controller and steering gear according to the present invention may be used with four-wheel steering systems in which no mechanical link is provided between the front steering gear and the rear steering gear.

1 Claim, 3 Drawing Sheets

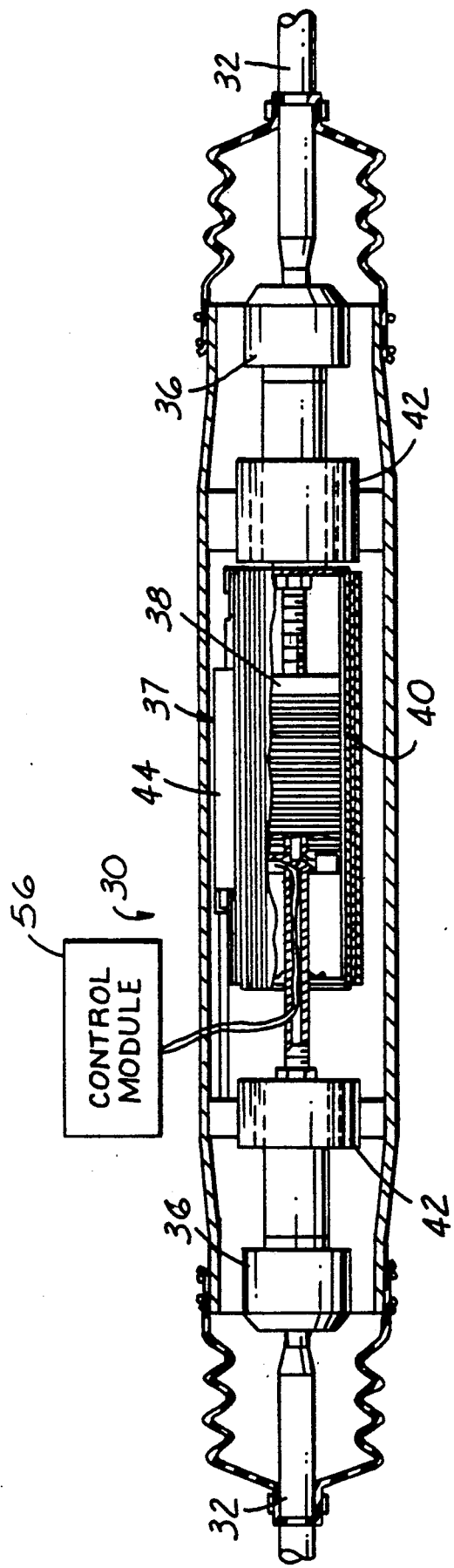
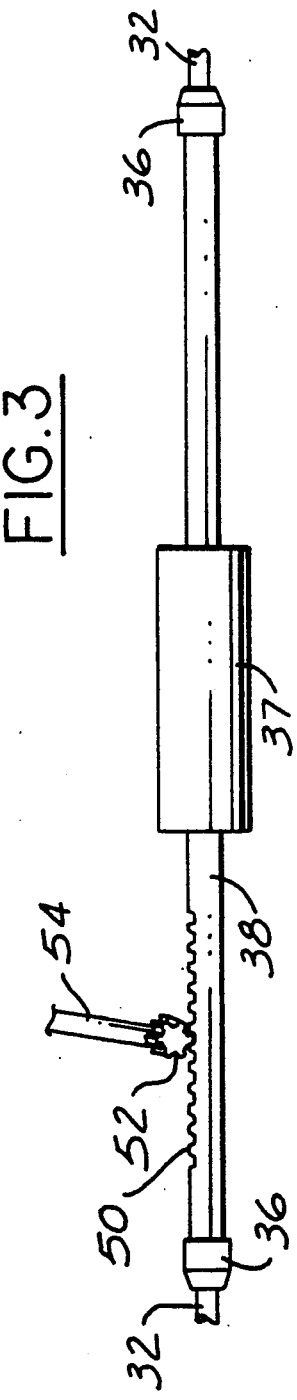
FIG.2
FIG.3

STEERING GEAR AND SYSTEM FOR AUTOMOTIVE VEHICLE

This is a continuation of copending application Ser. No. 7/292,178 filed on 12/30/88 now abandoned.

BACKGROUND OF THE INVENTION

1. Field of the Invention

This invention relates to a steering gear and control system for an automotive vehicle in which the prime mover for operating the steering gear comprises a linear electric motor.

2. Disclosure Information

Power assisted steering systems have been widely employed in automotive vehicles for a number of years. One common type of power assisted steering utilizes a hydraulic pump driven by the crankshaft of the vehicle engine, with the Pump being operatively connected with the steering gear so as to provide hydraulic boost to the driver's steering effort. Electrically driven power assist systems are also known. An example of such a system is disclosed in U.S. Pat. No. 4,785,901. Electrically driven power assist systems commonly utilize control algorithms having as their inputs steering driveshaft torque and vehicle velocity The torque sensor is adapted to respond to the steering load and the speed sensor is adapted to respond to the speed of the vehicle. Electrically powered steering systems also commonly utilize a control module for operating the electric prime mover. The electric prime movers commonly comprise geared rotary types of motors. Such gearing is costly and often quite complex. It is an advantage of the present invention that all such motor gearing and the rotary motor itself are replaced with a linear motor having but a single major moving component.

It is an object of the present invention to provide a linear motor equipped steering gear suitable for steering the rear roadwheels of a vehicle equipped with four-wheel steering.

It is a further object of the present invention to provide a four-wheel steering system using a linear motor either at only the rear position of the vehicle or at both the front and rear positions of the vehicle.

It is an advantage of the present invention that a four-wheel steering system using a linear motor steering gear at only the rear position of the vehicle, or at both the front and rear positions of the vehicle, will not require a driveshaft extending from the front steering gear to the rear steering gear.

Further objects, features and advantages of the present invention will become apparent to those skilled in the art in view of this specification.

SUMMARY OF THE INVENTION

In accordance with this invention, a steering gear for an automotive vehicle comprises a linear electric motor having a plunger linked to an axle set of roadwheels of the vehicle and a controller for operating the linear motor. The controller preferably comprises means for sensing torque applied to a steering shaft attached to a steering handwheel operated by the driver of the vehicle and means for generating a control signal for said linear motor based upon the sensed torque. The controller may further comprise means for sensing the forward velocity of the vehicle and for generating a control signal for the linear motor based upon the sensed velocity.

In the event that a steering gear according to the present invention is employed as a rear wheel steering gear, the controller preferably comprises means for sensing the operational position of a front wheel steering gear controlled by the driver of the vehicle and means for generating a position signal for the linear motor of the rear steering gear based upon the position of the driver-controlled steering gear.

A linear electric motor equipped steering gear according to the present invention may also be used as a driver-controlled steering gear. In such case, the plunger of the linear electric motor will include a geared rack. The controller in such case may comprise means for sensing torque applied to a steering shaft geared to the rack and attached to a steering handwheel operated by the driver of the vehicle. In such case, the control means will generate a control signal based upon sensed torque.

According to yet another aspect of the present invention, a steering system for a vehicle comprises a first steering gear linked to a first axle set of roadwheels, with said steering gear being operated by the driver of the vehicle, and a second steering gear driven by a linear electric motor and linked to a second axle set of roadwheels. Said steering system further comprises a controller for operating the linear motor, with the controller including, without limitation, detection means for detecting the operating position of the driver-controlled steering gear, and signal generation means for generating a position signal for the linear motor based at least upon the detected position of the first steering gear. In the event that the first steering gear includes a linear electric motor as the prime mover, the controller will further preferably comprise means for sensing torque applied to a steering shaft interposed between the first steering gear and the steering handwheel operated by the driver of the vehicle, and means for sensing the velocity of the vehicle. Finally, the controller will include means for generating a control signal for the linear motor of the first steering gear.

BRIEF DESCRIPTION OF THE DRAWINGS

FIG. 2 is a partially schematic view of a steering gear incorporating a linear motor according to the present invention.

FIG. 3 is a schematic representation of a driver-controlled steering gear incorporating a linear motor according to the present invention.

DESCRIPTION OF THE PREFERRED EMBODIMENTS

Figure 1:
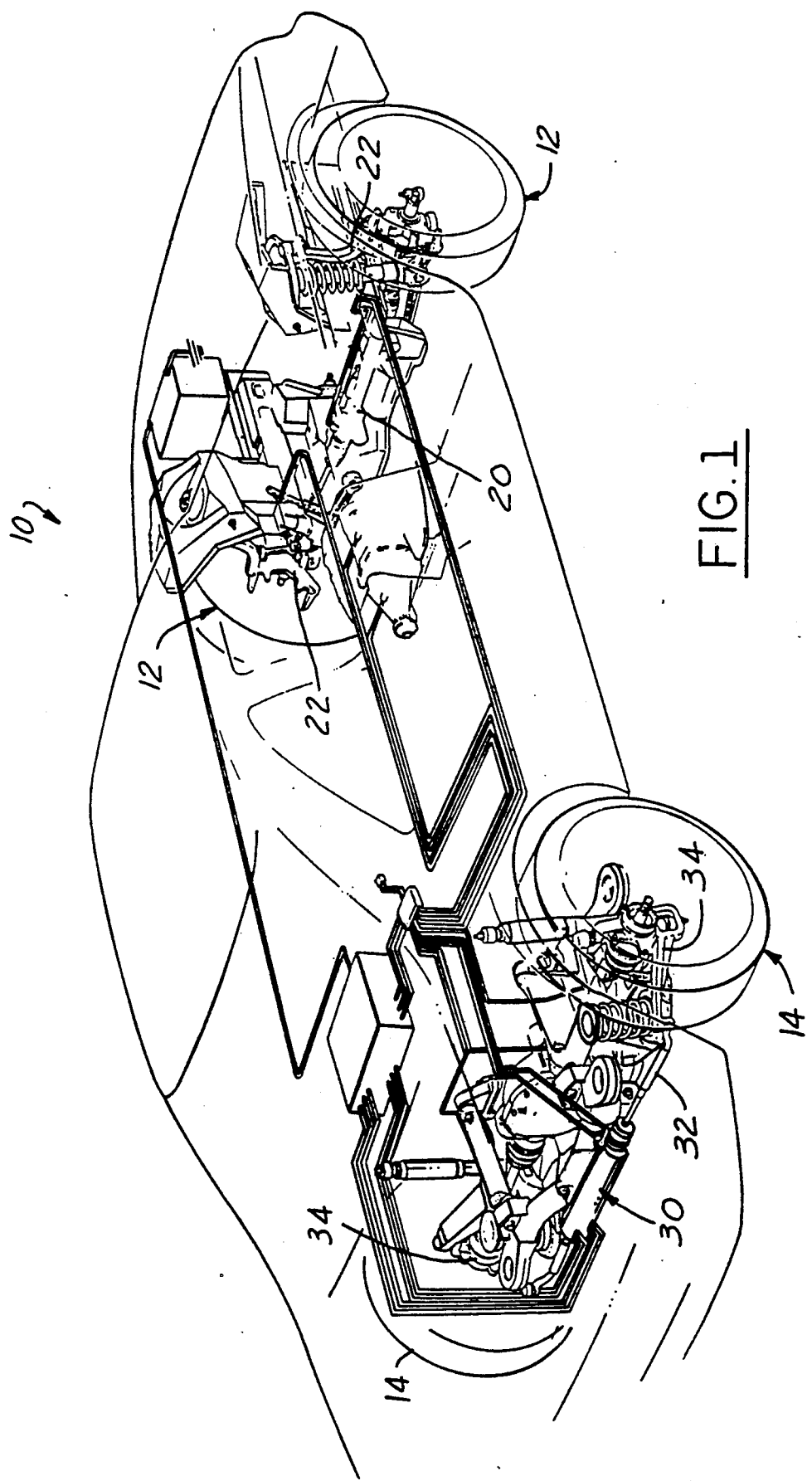
FIG. 1 is a perspective view of an automotive vehicle incorporating a steering gear and system according to the present invention.

As shown in FIG. 1, vehicle 10 is equipped with front roadwheels 12 and rear roadwheels 14. The front roadwheels are steered by front steering gear 20, whereas the rear roadwheels are steered by rear steering gear 30. Front steering gear 20 operates roadwheels 12 by providing steering inputs to front spindles 22 via tierods (not shown). Conversely, rear steering gear 30 provides steering inputs to rear spindles 34 by means of tierods 32. Tierods 32 are shown as extending from steering gear 30 in FIG. 2. Steering gear 30 comprises inner tierod ends 36 which provide a pivotable attachment for joining the balance of the steering gear to tierods 32. Steering gear 30 further comprises linear electric motor 37, which includes plunger 38. The plunger is mounted reciprocably within stator 40.

Linear motor 37 is an induction motor in which only plunger 38 is wound. Hollow stator 40 comprises a conductive metallic structure which carries induced currents. Force in an induction motor is caused by the interaction between an applied magnetic field in one member (in this case, the plunger), and currents induced in the conductor of a second member (in this case, the stator) on the other side of a separating air gap. Plunger 38 is attached at its extreme ends to inner tierod ends 36. Plunger 38 conventionally comprises lamination packs, steel coils, magnet wire coils, end caps, and a central shaft through which wires are conducted to system control module 56. As noted above, plunger 38 is slidably carried within stator 40, which is mounted rigidly to the chassis of vehicle 10. Stator 40 comprises a bimetallic tube having an aluminum inner surface and a steel outer surface. The two sleeves are assembled and then the inner bore is honed for straightness.

In response to signals from system control module 56, Plunger 38 will be caused to move reciprocably within stator 40, and as a result the roadwheels which are attached to the spindles steered by tierods 32 will in turn be steered. Linear motor 37 further includes resolver 44 which performs two functions in conjunction with control module 56. The first function performed jointly by the resolver and the control module is electronic commutation of linear motor 37. In other words, resolver 44 allows system control module 56 to know the position of plunger 38 within stator 40 so that appropriate currents may be supplied to the plunger's windings. The second function performed by the resolver and control module stems from the first function. The second function encompasses the notion that the resolver allows the system control module to know the precise position of the plunger at all times so that the steering condition of the roadwheels steered by the present steering gear will be known by the system control module. As a result, the control module will have information necessary to allow operation of the system. More specifically, resolver 44 will advise control module 56 whenever the plunger has come to the end of its travel in either direction, as well as keeping precise track of the location of the plunger at any intermediate position.

The control module comprises a microprocessor including a ROM in which is stored various constants and control programs for controlling the steering gear. The microprocessor further includes a CPU for reading out control programs from the ROM so as to execute required operations and a RAM which temporarily stores various data related to the operations to be executed within the CPU and which allows the CPU to read out the data stored therein. Finally, the control module includes input-output devices and power supplies for operating linear motor 37.

Figure 4:
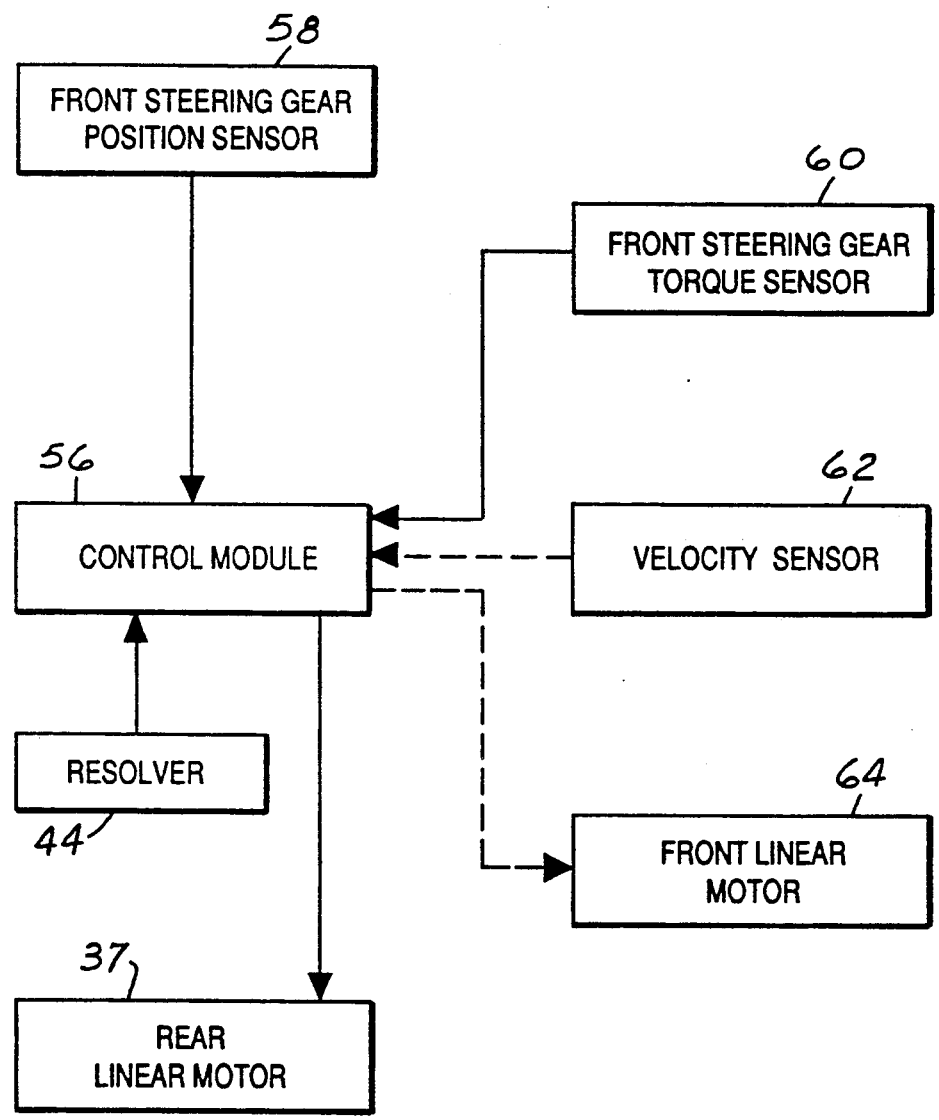
FIG. 4 is a system block diagram showing the component parts of a four wheel steering system employing a linear motor according to the present invention.

A second type of steering gear employing a linear motor according to the present invention is illustrated in FIG. 3. Plunger 38 is equipped with gear teeth 50, which mesh with pinion 52 mounted at the end of steering shaft 54. Thus, as the steering shaft is rotated by the driver of the vehicle, pinion 52 will transmit force to plunger 38. This force will directly result from torque imposed on the steering shaft from the driver. This torque is sensed by front steering gear torque sensor 60 (FIG. 4). The value of the sensed torque is one of the parameters which may be used by control module 56 to operate front linear motor 64. Because the steering gear of FIG. 3 is directly operable by means of a steering shaft, this gear may be used as steering gear 20 at the front position of vehicle 10.

In the event that a steering gear having a linear electric motor as its prime mover is used for the purpose of steering the rear wheels of a vehicle according to the present invention in conjunction with a conventional front steering gear, system control module 56 will receive inputs only from front steering gear position sensor 58, which detects the steering operating position of the front wheels, and resolver 44. If, however, both front and rear steering gears are equipped with linear electric motors, system control module 56 will receive further inputs from front steering gear torque sensor 60 and vehicle velocity sensor 62. The inputs from front steering gear torque sensor 60 and velocity sensor 62 will permit control module 56 to operate front steering gear linear motor 64 by providing a motor control signal dependent upon the driver's torque input to the steering shaft and the speed of the vehicle.

Those skilled in the art will appreciate in view of this disclosure that a variety of known control algorithms could be employed for linking the front and rear steering gears of a vehicle using linear motors according to the present invention. For example, the rear steering gear could be operated so as to steer the rear wheels out of phase at lower speeds, neutrally at medium speeds, and in phase with the front wheels at higher road speeds. It should be understood that the control scheme chosen for the front steering gear will depend upon the individual dictates of the vehicle being considered for such a system. Similarly, the precise form of linear motor chosen for implementing a system according to this invention may change with the individual requirements of the vehicle. For example, the stator and plunger could both be wound, or the stator only could be wound, with the plunger comprising a permanent magnet. It will thus be further understood that the invention herein is not to be limited to the exact construction shown and described and that various changes and modifications may be made without departing from the spirit and scope of the invention as defined by the appended claims.

I claim:

1. A steering system for a vehicle having front and rear pairs of steerable roadwheels, comprising:
   a first steering gear operatively connected to said front pair of roadwheels,
      said first steering gear being constructed to be operated by a driver of said vehicle and to set said front pair of roadwheels at a steering angle directly determined by the vehicle operator;
   means for sensing the operating position of the steering gear and for generating a front roadwheel steering angle signal;
   means for sensing steering torque applied to a steering shaft interposed between said first steering gear and a steering handwheel operated by the driver of said vehicle and for generating a torque signal;
   a second steering gear for steering the rear pair of roadwheels,
      said second steering gear having a linear electric induction motor including a bimetalic tubular stator attached to a chassis of said vehicle and having an inner surface formed of aluminum and an outer surface formed of steel, said motor having a plunger linked to said rear roadwheels constructed to transmit a steering force to said rear wheels, said plunger being adapted to reciprocate within said stator;

means for sensing the position of said plunger within said stator and for generating a rear roadwheel steering angle signal;

means for determining vehicle speed and for generating a vehicle speed signal; and a controller constructed to receive said front road wheel steering angle signal, said steering torque signal, said rear roadwheel steering angle signal, and said vehicle speed signal, said controller being constructed to generate a control signal for operating said linear motor based upon said plurality of signals, whereby the steering angle of said rear pair of roadwheels is set at an optimum angle for vehicle driving conditions without direct control by the vehicle operator.

* * * * *